United States Patent
Schulz et al.

[11] Patent Number: 5,724,238
[45] Date of Patent: Mar. 3, 1998

[54] CIRCUIT ARRANGEMENT FOR PRODUCING AN A.C. VOLTAGE FOR DRIVING A PANE OR PANEL HAVING A VARIABLE LIGHT TRANSPARENCY

[75] Inventors: Stephan Schulz, Neu Wulmstorf; Christian Dehnke, Hamburg, both of Germany

[73] Assignee: Daimler-Benz Aerospace Airbus GmbH, Hamburg, Germany

[21] Appl. No.: 759,260

[22] Filed: Dec. 2, 1996

[30] Foreign Application Priority Data

Dec. 1, 1995 [DE] Germany ............ 195 44 744.1

[51] Int. Cl.$^6$ .................. H02M 5/20; G02F 1/153
[52] U.S. Cl. .................. 363/159; 359/275
[58] Field of Search .............. 363/59, 159; 359/274, 359/275

[56] References Cited

U.S. PATENT DOCUMENTS

| | | | |
|---|---|---|---|
| 4,336,582 | 6/1982 | Brantley et al. | 363/59 |
| 4,529,873 | 7/1985 | Ballmer et al. | 350/357 |
| 5,285,371 | 2/1994 | Sanada et al. | 363/159 |
| 5,397,888 | 3/1995 | Muramatsu | 359/275 |
| 5,608,567 | 3/1997 | Grupp | 359/275 |

FOREIGN PATENT DOCUMENTS

| | | |
|---|---|---|
| 3816069 | 11/1989 | Germany . |
| 4328726 | 3/1995 | Germany . |

Primary Examiner—Stuart N. Hecker
Attorney, Agent, or Firm—W. G. Fasse; W. F. Fasse

[57] ABSTRACT

A power supply circuit generates an alternating driving voltage for switching a pane or panel between a transparent state and a substantially opaque state. The pane or panel is, for example, a window with a variable transparency in an aircraft cabin divider. The circuit converts a D.C. voltage that is available, for example, from the aircraft's on-board power supply, into a positive and negative D.C. voltage. These voltages pass through a push-pull output amplifier that is under the control of a clock signal generator to produce the alternating driving voltage at the output of the push-pull amplifier connected to transparent electrodes of the pane or panel that contains liquid crystals. Status sensors may influence the operation of the clock signal generator and/or of the push-pull amplifier.

9 Claims, 1 Drawing Sheet

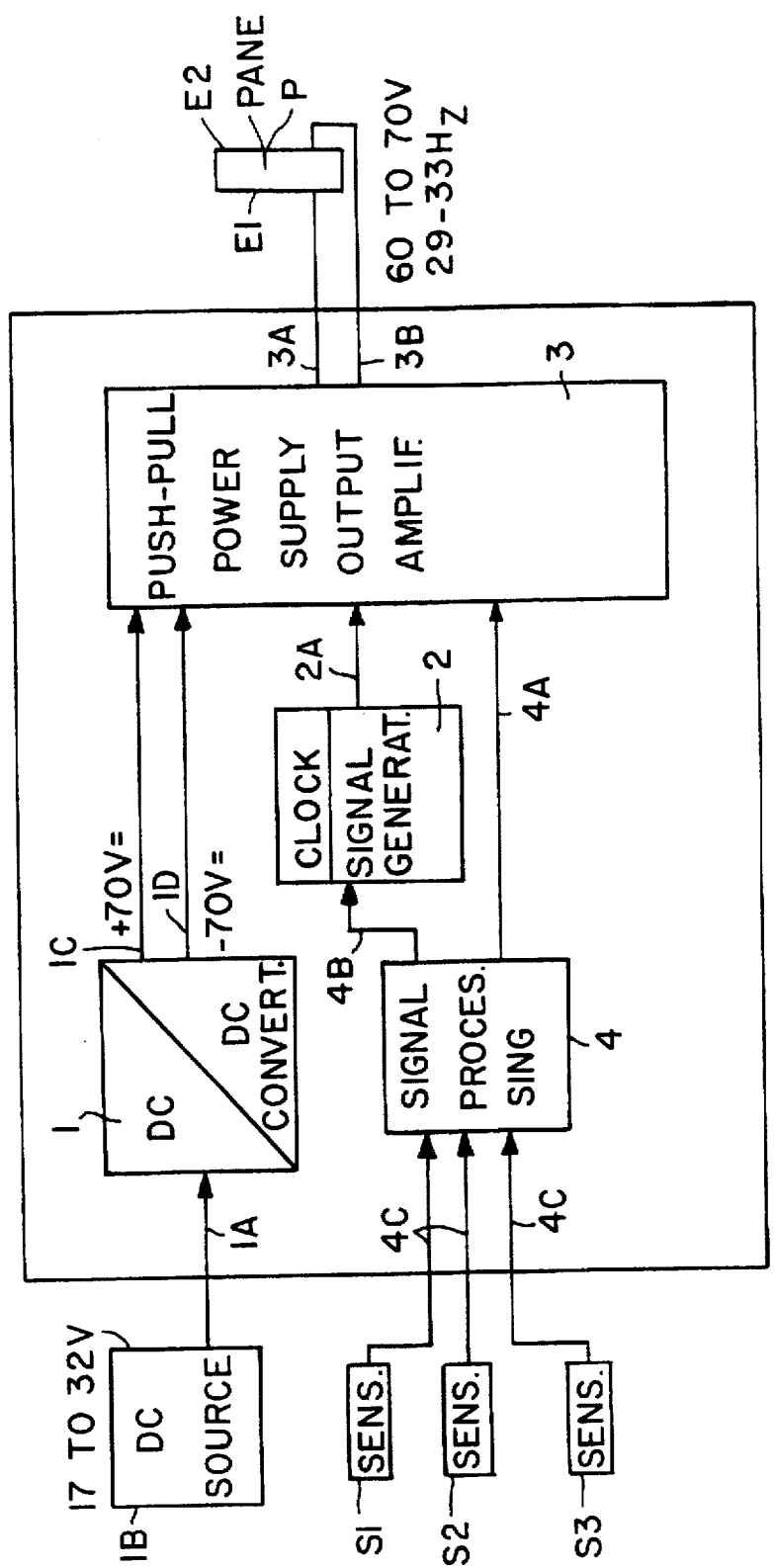

CIRCUIT ARRANGEMENT FOR PRODUCING AN A.C. VOLTAGE FOR DRIVING A PANE OR PANEL HAVING A VARIABLE LIGHT TRANSPARENCY

FIELD OF THE INVENTION

The invention relates to a power supply circuit for driving a pane having a variable light transparency. The pane has liquid crystals between transparent electrodes. When a driving voltage is applied, the pane becomes transparent. When the driving voltage is switched off, the pane becomes substantially opaque.

BACKGROUND INFORMATION

Panes of the above type may, for example, be arranged in an aircraft to form a window in a cabin or room divider. Operating such window panes directly from the on-board power supply network is undesirable because such network has a limited loadability having regard to the given low output D.C. voltage of on-board power supply systems.

Panes or window panes of the type described above are disclosed for example in German Patent Publication DE 3,816,069 A1, (Uhl), published Nov. 16, 1989. Such panes can be used directly as the window or as an attachment to a window. These panes are made of transparent material such as glass, synthetic materials or other transparent materials sandwiched between two transparent electrodes and holding liquid crystal elements as a layer or film between the electrodes. The pane material can also be covered with a film or layer of the liquid crystals which in turn is covered by transparent electrodes on both sides, whereby an applied A.C. voltage makes the device transparent or substantially transparent while switching off the driving voltages makes the device opaque or substantially opaque. Such devices are used in house and building construction, and in vehicle, ship and aircraft construction. However, particularly in aircraft construction the problem of a proper power supply for such panes has not yet been solved.

German Patent Publication 4,328,726 A1 (Girlich), published Mar. 2, 1995 discloses an arrangement for controlling the light transparency of a window of the type described above especially for use in an aircraft. The known arrangement includes at least one control unit for at least one liquid crystal film and a light sensor as well as a closed loop controller responsive to the light sensor. The known arrangement is capable of providing a continuous, stepless variation of the light transparency of the liquid crystal film in that the alternating driving voltage is variable between zero and a maximum value while its frequency is maintained constant. The control unit, the liquid crystal film, and the light sensor form the closed loop control circuit in such a way that the signal representing the brightness as measured by the light sensor is compared with a reference brightness stored in the closed loop control circuit, whereby the driving voltage for the liquid crystal film is controlled so that the measured brightness becomes equal to the stored rated brightness.

OBJECTS OF THE INVENTION

In view of the above it is the aim of the invention to achieve the following objects singly or in combination:

to provide a power supply circuit arrangement for driving a liquid crystal pane which circuit is so constructed that it will work with a minimum power dissipation of a D.C. power supply, especially an on-board D.C. power supply network which has loading limitations that must meet safety regulations;

to control the application of the driving voltage to the electrodes of the pane in response to sensor signals; and to control the power supply for a liquid crystal pane or panel so that the pane or panel is opaque during flight and transparent during starting and landing.

SUMMARY OF THE INVENTION

The power supply circuit according to the invention is characterized by a D.C./D.C. converter which converts a relatively low D.C. voltage at its input into two relatively higher D.C. voltages at its two outputs. These two outputs of the D.C./D.C. converter are connected to a push-pull power output amplifier which provides at its output the alternating driving voltage of a size sufficient for driving the above mentioned type of pane or panel. The push-pull power output amplifier has two stages which are controlled by a clock signal generator which produces a digital clock signal, preferably a low-frequency clock signal.

In a further embodiment the power supply circuit comprises sensors which provide signals for controlling the clock circuit and/or the push-pull output amplifier.

Preferably, the two D.C. output voltages of the D.C./D.C. converter are about twice as large as the input voltage coming, for example, from a D.C. on-board power supply in an aircraft. In another embodiment the above mentioned sensors provide operational status signals, for example of the propulsion plants and of the landing flaps and/or landing gear of the aircraft during starting or during landing. The sensor output signals pass through a signal processing circuit to provide control signals for the clock signal generator and/or for the push-pull power amplifier in such a way that during starting or landing of the aircraft the push-pull output amplifier provides at its output the alternating driving voltage for the pane or panel. The transparency or opaqueness of the pane is controlled automatically in response to certain operating conditions of the aircraft.

BRIEF DESCRIPTION OF THE DRAWINGS

In order that the invention may be clearly understood, it will now be described, by way of example, with reference to the single Figure of the accompanying drawings showing a block diagram of the present power supply circuit for a pane or panel having a variable light transparency.

DETAILED DESCRIPTION OF PREFERRED EXAMPLE EMBODIMENTS AND OF THE BEST MODE OF THE INVENTION

The single Figure shows a block diagram of the present power supply circuit including a D.C./D.C. converter 1 having an input 1A connected to a D.C. power source 1B delivering, for example a voltage within the range of 17 to 32 Volts as is customary in on-board aircraft power supply systems. The D.C. converter delivers two D.C. voltages that are substantially higher than the voltage at its input. For example, the output 1C delivers a positive voltage of, for example +70V D.C. and the output 1D delivers a negative D.C. voltage of, for example −70V D.C. These voltages are supplied to a push-pull power supply output amplifier 3 having two stages cooperating in push-pull fashion under the control of a clock signal generator 2 connected at 2A to a first control input of the power supply amplifier 3. The amplifier 3 has two output terminals 3A, 3B that are connected to the transparent electrodes E1 and E2 of a pane or panel P for driving this pane or panel P between transparent and opaque states. The alternating driving voltage at the output terminals 3A, 3B is preferably within the range of 60 to 70V, preferably at a frequency of 29 to 33 Hz. Different voltages and frequencies may be generated if needed. For aircraft purposes the above voltages and frequencies are preferred.

The present circuit arrangement further comprises a signal processing circuit 4 having a first output 4A connected to a further control input of the push-pull amplifier 3. The signal processing circuit 4 has a second output 4B connected to the clock signal generator 2. Further, the signal processing circuit 4 comprises a plurality of inputs 4C connecting the signal processing circuit 4 to a plurality of sensors S1, S2, and S3. These sensors measure status conditions under which the pane or panel P is supposed to be either transparent or opaque.

In the preferred example embodiment the sensors S1 and S2 may provide information regarding the power propulsion plant of an aircraft while the sensor S3 provides information regarding the position of landing flaps during starting and landing of the aircraft. Thus, the pane or panel P may be switched opaque during cruising flight when the amplifier 3 does not provide any output and it may be switched transparent during starting and landing when the amplifier 3 provides the alternating driving voltage of a high enough voltage and proper frequency for driving the pane or panel P. The signal processing circuit 4 processes the output signals from the sensors S1, S2, S3, for example by amplification to provide proper control signals at 4A for the push-pull amplifier 3 and/or at 4B for the clock signal generator 2 which controls the frequency of the alternating driving voltage.

Although the invention has been described with reference to specific example embodiments, it will be appreciated that it is intended to cover all modifications and equivalents within the scope of the appended claims.

What is claimed is:

1. A power supply circuit for a pane or panel having a variable light transparency in response to an alternating driving voltage applied by said power supply circuit to transparent electrodes of said pane or panel, comprising a D.C. voltage converter (1) having an input (1A) for connection to a D.C. power source and two outputs (1C, 1D) for providing two D.C. output voltages which are substantially higher than a voltage of said D.C. power source, a push-pull power output amplifier (3) having first and second inputs connected to respective outputs of said two outputs (1C, 1D) of said D.C. voltage converter (1), at least one control signal input (2A), and a power output (3A, 3B) for providing said alternating driving voltage, said power supply circuit further comprising an electronic clock signal circuit (2) connected to said at least one control input (2A) of said push-pull power output amplifier (3) for providing a low frequency clock signal to said push-pull power output amplifier (3), for controlling the output of said alternating driving voltage.

2. The power supply circuit of claim 1, wherein said electronic clock signal circuit (2) comprises a clock signal generator (2) for generating said clock signal as a digital clock signal.

3. The power supply circuit of claim 1, further comprising at least one sensor (S1) for providing at least one status signal, a signal processing circuit (4) having an input connected to said at least one sensor (S1) for processing said status signal to provide a control signal, said electronic clock signal circuit (2) having an input (4B) connected to said signal processing circuit (4) for receiving said control signal to start or stop said clock signal generator (2) for controlling the frequency of said alternating driving voltage.

4. The power supply circuit of claim 3, wherein said signal processing circuit (4) comprises an output connected directly to said push-pull power output amplifier (3) for switching said push-pull power output amplifier (3) on or off in response to said control signal dependent on said status signal from said sensor.

5. The power supply circuit of claim 3, comprising a plurality of sensors (S1, S2, S3) for sensing the operational status of engines and landing flaps in an aircraft during starting or landing to provide respective status signals to said signal processing circuit (4) for controlling said electronic clock signal circuit (2) and said push-pull power output amplifier (3) so that said pane or panel (P) receives said alternating driving voltage for switching said pane or panel (P) transparent during starting or landing of said aircraft.

6. The power supply circuit of claim 1, further comprising a D.C. power source (1B) connected to said input of said D.C. voltage converter (1), said D.C. power source providing a D.C. voltage within the range of about 17 to 32 Volts, said D.C. voltage converter (1) providing a D.C. voltage of +70 Volts at one of said two outputs and a D.C. voltage of −70 Volts at the other of said two outputs of said D.C. voltage converter (1).

7. The power supply circuit of claim 2, wherein said clock signal generator (2) produces said clock signal with a frequency within the range of 29 to 33 Hz.

8. The power supply circuit of claim 1, wherein said push-pull power output amplifier (3) provides at said power output (3A, 3B) said alternating driving voltage within a range of 60 to 70 Volts and at a frequency within a range of 29 to 33 Hz.

9. The power supply circuit of claim 1, wherein said power output (3A, 3B) of said push-pull power output amplifier (3) is connected to transparent electrodes (E1, E2) of said pane (P) which is installed in an aircraft as a divider between two spaces in the aircraft.

* * * * *